(12) United States Patent
Fujiwara et al.

(10) Patent No.: US 12,162,334 B2
(45) Date of Patent: Dec. 10, 2024

(54) DEVICE FOR OPENING AND CLOSING OPENING/CLOSING BODY

(71) Applicant: HI-LEX CORPORATION, Takarazuka (JP)

(72) Inventors: Ken-Ichi Fujiwara, Takarazuka (JP); Atsushi Joko, Takarazuka (JP); Hiromu Daidou, Takarazuka (JP)

(73) Assignee: HI-LEX CORPORATION, Takarazuka (JP)

( * ) Notice: Subject to any disclaimer, the term of this patent is extended or adjusted under 35 U.S.C. 154(b) by 728 days.

(21) Appl. No.: 17/293,263

(22) PCT Filed: Nov. 20, 2019

(86) PCT No.: PCT/JP2019/045337
§ 371 (c)(1),
(2) Date: May 12, 2021

(87) PCT Pub. No.: WO2020/105652
PCT Pub. Date: May 28, 2020

(65) Prior Publication Data
US 2022/0016960 A1   Jan. 20, 2022

(30) Foreign Application Priority Data

Nov. 20, 2018   (JP) .................. 2018-217571

(51) Int. Cl.
*E05B 81/00* (2014.01)
*B60J 5/10* (2006.01)
(Continued)

(52) U.S. Cl.
CPC ................ *B60J 5/10* (2013.01); *E05B 81/20* (2013.01); *E05B 81/66* (2013.01); *E05B 81/70* (2013.01); *E05F 15/611* (2015.01); *E05F 15/659* (2015.01)

(58) Field of Classification Search
CPC .. B60J 5/10; E05B 81/20; E05B 81/70; E05F 15/611
See application file for complete search history.

(56) References Cited

U.S. PATENT DOCUMENTS 6,776,448 B2 *   8/2004   Matsui ................... E05B 81/20
                                                             296/146.4
2003/0030299 A1   2/2003   Cleland et al.

FOREIGN PATENT DOCUMENTS

| JP | 2004161181 A |   | 6/2004 |
| JP | 2004190416 A | * | 7/2004 |
| JP | 2014145226 A |   | 8/2014 |

OTHER PUBLICATIONS

ISR issued in Int'l. Application No. PCT/JP2019/045337, mailed Jan. 7, 2020.

* cited by examiner

*Primary Examiner* — Daniel J Troy
*Assistant Examiner* — Daniel Alvarez
(74) *Attorney, Agent, or Firm* — Greer Burns & Crain Ltd.

(57) ABSTRACT

A device for opening and closing opening/closing body comprising: an opening/closing body to open/close with respect to an opening of a base body; a closing mechanism; a control portion to control the closing mechanism; and a position detection portion, wherein the closing mechanism includes an engaging portion provided in either one of the base body and the opening/closing body; an engaged portion provided in the other of the base body and the opening/closing body; a closing mechanism drive portion to shift the engaging portion between being an opened state and a closed state; and an interaction detection portion to detect interaction between the engaging portion and the engaged portion; and the control portion carries out zero position (Continued)

setting to set position information to the zero position when the engaging portion shifts to the closed state or to the opened state.

6 Claims, 8 Drawing Sheets

(51) Int. Cl.
*E05B 81/20* (2014.01)
*E05B 81/66* (2014.01)
*E05B 81/70* (2014.01)
*E05F 15/611* (2015.01)
*E05F 15/659* (2015.01)

DEVICE FOR OPENING AND CLOSING OPENING/CLOSING BODY

This is a National Phase Application filed under 35 U.S.C. § 371, of International Application No. PCT/JP2019/045337, filed Nov. 20, 2019, the contents of which are incorporated by reference.

TECHNICAL FIELD

The invention relates to a device for opening and closing an opening/closing body.

BACKGROUND ART

With respect to an opening/closing body to bring an opening of a base body to be in an opened state or to be in a closed state, the current position of the opening/closing body needs to be detected to stop driving at an appropriate position or to drive at a drive speed according to the position when driving the opening/closing body by a drive portion. The current position of the opening/closing body can be detected by detecting a pulse signal corresponding to the driving of the drive portion, for example. However, it is known that transmission errors may occur in such a detection signal due to secular change or the like.

As a means to prevent an inaccurate position detection due to accumulation of such transmission errors, a device for opening and closing an opening/closing body in which an integrated value of a pulse signal is reset when a switching member of a closing mechanism is operated and the integrated value is not reset when the opening/closing body is positioned in the fully-closed position is proposed (For example, Patent document 1).

PRIOR ART DOCUMENT

Patent Document

Patent Document 1: JP2004-190416A

SUMMARY OF THE INVENTION

Problem to be Solved by the Invention

However, in case that the integrated value of the pulse signal is reset by an operation of the switching member of the closing mechanism with the opening/closing body in a situation in which the opening/closing body is movable, such as on a slope, if the opening/closing body moves before the opening/closing body is locked and the integrated value of the pulse signal is reset when the opening/closing body is located at a position being different from a locking position of the opening/closing body being locked by the closing mechanism, it is difficult to differentiate the position from the correct reset position. In case that the integrated value of the pulse signal is reset at the position being different from the correct reset position and zero position of the opening/closing body is set, there might be a problem of an operation of the opening/closing body due to an amount corresponding to the difference between the above position and the correct zero position. On the other hand, when the movement amount of the opening/closing body is set to be small to ensure that such a problem of the operation of the opening/closing body does not arise, the convenience decreases.

An object of the invention is to provide a device for opening and closing an opening/closing body that makes it possible to set zero position of an opening/closing body by locking with a closing mechanism, even when zero position of the opening/closing body has set at an inappropriate position.

Means to Solve the Problem

A device for opening and closing opening/closing body that solves the above-described problem has the following features:

In other words, the device for opening and closing opening/closing body comprising: an opening/closing body to open/close with respect to an opening of a base body; a closing mechanism to lock the opening/closing body in a closed state; a control portion to control driving of the closing mechanism; and a position detection portion to detect the position of the opening/closing body, wherein the closing mechanism includes an engaging portion being provided in either one of the base body and the opening/closing body; an engaged portion being provided in the other of the base body and the opening/closing body; a closing mechanism drive portion to shift the engaging portion between an opened state and a closed state; and an interaction detection portion to detect that the engaging portion and the engaged portion interacted with each other; the opened state of the engaging portion is a state in which the engaged portion is movable to a position in which the engaged portion can engage with the engaging portion; the closed state of the engaging portion is a state in which the engaged portion is locked by the engaging portion; and the control portion carries out zero position setting to set position information to the zero position, the position information showing the position of the opening/closing body, when the engaging portion of the closing mechanism shifts to the closed state or to the opened state. Moreover, while the device for opening and closing opening/closing body can manually bring the opening/closing body to the closed state, the control portion can cause the closing mechanism drive portion to carry out closing driving to shift the engaging portion to the closed state when interactive information that the engaging portion and the engaged portion interacted is obtained.

Effects of the Invention

The invention makes it possible to set zero position of an opening/closing body by locking with a closing mechanism, even when zero position of the opening/closing body has set at an inappropriate position.

EMBODIMENT FOR CARRYING OUT THE INVENTION

Next, an embodiment for carrying out the invention will be described using the attached drawings.

[Overview of a Device for Opening and Closing an Opening/Closing Body]

A device for opening and closing an opening/closing body 1 shown in FIGS. 1 to 4 being one embodiment of a device for opening and closing an opening/closing body according to the invention is provided in a vehicle 10. The device for opening and closing opening/closing body 1 is a device to control the opening/closing operation of a back door (opening/closing body) 12 to open/close an opening 11a of a vehicular body 11 in the vehicle 10. The vehicular body 11 is one example of a base body, and the back door 12 is one example of the opening/closing body.

The device for opening and closing opening/closing body 1 has the back door 12, an opening/closing body drive portion 20, a closing mechanism 30, a position detection portion 40, and a control portion 50. The control portion 50 controls driving of the opening/closing body drive portion 20 and the closing mechanism 30.

The opening 11a is positioned in the rear of the vehicular body 11. The back door 12 is provided in the rear of the vehicular body 11 and is configured such that the back door 12 can open/close the opening 11a. An upper edge of the back door 12 is rotatably supported by the vehicular body 11 via a hinge. The back door 12 can be shifted between the closed position (see FIG. 2) and the opened position (see FIG. 3) by moving around the upper edge.

[Opening/Closing Body Drive Portion]

The opening/closing body drive portion 20 moves the opening/closing body 12 in the opening direction and in the closing direction with respect to the opening 11a of an opening member 100. The opening/closing body drive portion 20 may be in a plurality. In the embodiment, two opening/closing body drive portions 20 are provided, one of which is provided to the left end of the opening/closing body 12 and to the left edge of the opening 11a and the other of which is provided to the right end of the opening/closing body 12 and to the right edge of the opening 11a. Each of the opening/closing body drive portions 20 drives and moves the opening/closing body 12 so that the opening/closing body 12 relatively moves with respect to the opening member 100 to be shifted into the opened state or into the closed state.

The two opening/closing body drive portions 20 move the opening/closing body 12 in a direction in which the opening/closing body 12 is brought to be in the opened state (the opening direction) and in a direction in which the opening/closing body 12 is brought to be in the closed state (the closing direction). Each of the opening/closing body drive portions 20 may drive the opening/closing body 12 in the same direction and in the same drive amount as long as the opening/closing body 12 may be shifted into the opened state and into the closed state. Moreover, each of the opening/closing body drive portions 20 may drive the opening/closing body 12 in different direction or in different drive amounts as long as each of the two opening/closing body drive portions 20 may move the opening/closing body 12 in the opening direction and in the closing direction. In the embodiment, each of the opening/closing body drive portions 20 is provided so as to carry out the same driving in synchronization.

One end of the opening/closing body drive portion 20 is connected to the opening member 100 and the other end of the opening/closing body drive portion 20 is connected to the opening/closing body 12. The opening/closing body 12 is provided so as to relatively move with respect to the opening member 100, and, in the embodiment, the opening/closing body 12 is provided to the opening member 100 so as to swing around the hinge. In order to swing and move the opening/closing body 12 with respect to the opening member 100, each of the opening/closing body drive portions 20 is swingably mounted to the opening member 100 so that the opening/closing body 12 is shifted into the opened state or into the closed state while swinging with respect to the opening member 100.

Specifically, each of the opening/closing body drive portions 20 is extendable and contractable and has a bar shape. Each of the opening/closing body drive portions 20 has a drive body portion arranged on one end side of the opening/closing body drive portion 20 and connected to the opening member 100, and an advancing/retreating portion arranged on the other end side of the opening/closing body drive portion 20 and connected to the opening/closing body 12. The advancing/retreating portion is mounted such that the advancing/retreating portion is projectable/retractable from/into the other end side of the drive body portion. Each of the opening/closing body drive portions 20 is connected to each of the opening member 100 and the opening/closing body 12 via a pivotable connection structure such as a ball joint.

The opening/closing body drive portion 20 can advance/retreat the advancing/retreating portion with respect to the drive body portion in the longitudinal direction of the opening/closing body drive portion 20 to move the opening/closing body 12 to a fully-closed position (in other words, the position in which the opening 11a is completely closed) and to a fully opened position (in other words, the position in which the opening 11a is maximally opened). Each of the opening/closing body drive portions 20 moves the opening/closing body 12 in the opening direction or in the closing direction by converting a rotational motion of a motor or the like into a linear extending/contracting motion.

While the opening/closing body drive portion 20 is provided in a total of two being one each at both the left and right ends of the rear of an automobile, the structure, drive scheme, shape, and arrangement of the opening/closing body drive portion 20 are not particularly limited as long as the opening/closing body drive portion can open/close the opening/closing body 12. For the opening/closing body drive portion 20, publicly known drive portions capable of driving the opening/closing body 12 may be adopted.

In the embodiment, the opening/closing body drive portion 20 has a tubular body 201, a sliding tubular portion 202, an opening/closing motor (not shown), a spindle (not shown), a spindle nut (not shown), and a biasing member (not shown). In the opening/closing body drive portion 20, the tubular body 201, the opening/closing motor, the spindle, and the biasing member correspond to the drive body portion. The sliding tubular portion 202 and the spindle nut correspond to the advancing/retreating portion.

One end side of the tubular body 201 is swingably mounted to the opening member 100 and the other end side of the tubular body 201 is opened. Inside the tubular body 201, the sliding tubular portion 202 is arranged to be capable of moving in a sliding manner in the longitudinal direction such that the sliding tubular portion 202 is projectable/retractable from/into the other end side of the tubular body 201.

When the opening/closing motor drives, the opening/closing motor moves the advancing/retreating portion in the longitudinal direction with respect to the drive body portion to extend/contract the opening/closing body drive portion 20. The opening/closing motor is a DC motor or an AC motor. In a case that the device for opening and closing opening/closing body 1 is applied to an automobile, the DC motor is desirably applied as the opening/closing motor, taking into account that a DC power supply of the automobile is used. The opening/closing motor is connected to the control portion 50, and rotational driving of both forward and reverse rotations is controlled by the control portion 50.

The sliding tubular portion 202 is biased by a biasing member from the one end side toward the other end side of the tubular body 201. The spindle nut into which the spindle to rotate axially by rotation of the opening/closing motor is screwed is provided inside the sliding tubular portion 202.

The opening/closing body 20 is configured that the tubular body 201 and the sliding tubular portion 202 do not mutually co-rotate by rotation of the spindle. When the opening/closing motor rotates in one of a forward direction and a reverse direction, the spindle rotates around one of the forward direction and the reverse direction around an axis of the spindle to move the spindle nut being screwed into the spindle along the longitudinal direction of the spindle. In conjunction therewith, the sliding tubular portion 202 having the spindle nut advances/retreats, or, in other words, slides in the longitudinal direction. In this way, the opening/closing drive portion 20 is movable so as to extend/contract, and the opening/closing body 12 opens/closes according to the length in which the sliding tubular portion 202 advances out of the tubular body 201.

The closing mechanism 30 is a mechanism to lock the back door 12 being at the closed position to the vehicle body 11. The closing mechanism 30 is provided to the vehicle body 11 and the back door 12. The closing mechanism 30 has a latch 31, a striker 32, an interaction detection portion 33, and a closing mechanism drive portion 34. The latch 31 is one example of an engaging portion, and the striker 32 is one example of an engaged portion. The latch 31 is mounted to the lower end of the back door 12. The striker 32 is mounted to the rear of the vehicular body 11. The striker 32 is arranged such that the striker 32 can be positioned at a position at which the striker 32 can engage with the latch 31 when the back door 12 is at the closed position. The latch 31 is configured to be engageable with the striker 32.

The latch 31 is configured to be shifted between the opened state and the closed state. The opened state of the latch 31 is a state in which the striker 32 can move from a position at which the striker 32 cannot engage with the latch 31 to a position at which the striker 32 can engage with the latch 31. The closed state of the latch 31 is a state in which the striker 32 is closed by the latch 31. In the closed state of the latch 31, such as in a full latch state, the striker 32 is prevented from moving by the latch 31. The position of the opened state of the latch 31 may also be called the fully-opened position, however, the opened state of the latch 31 may include the neutral position as long as the latch 31 can move to the position at which the latch 31 can engage with the striker 32. The position of the closed state of the latch 31 may also be called the fully-closed position, however, the closed state of the latch 31 can include the half-latch position as long as the striker 32 may be locked by the latch 31. The position of the closed state of the latch 31 is also the locking position of the striker 32.

The closing mechanism drive portion 34 is configured by a drive member to drive the latch 31. Shift between the opened state and the closed state of the latch 31 may be carried out by driving of the closing mechanism drive portion 34. The closing mechanism drive portion 34 is configured by a drive motor, for example.

In the device for opening and closing opening/closing body 1, when the back door 12 being at the opened position moves in the closing direction to reach the closed position, for example, the latch 31 reaches the position at which the latch 31 can engage with the striker 32.

In this state, mechanical driving of the latch 31 by pushing the back door 12, or driving of the closing mechanism drive portion 34 by the control portion 50 causes the striker 32 to be in a locked state. When the striker 32 is brought to be in the locked state, the opening in the rear of the vehicle is in a closed state completely closed by the back door 12.

Figure 1:
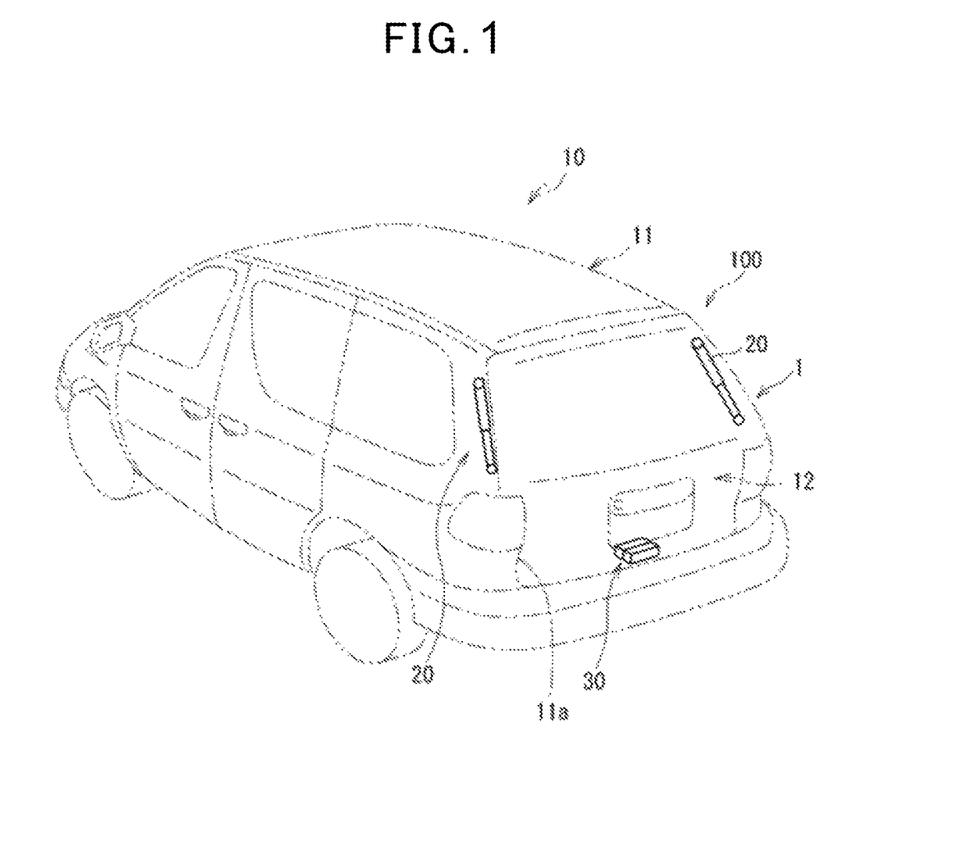
FIG. 1 shows a perspective view of a vehicle comprising a device for opening and closing an opening/closing body.
Figure 2:
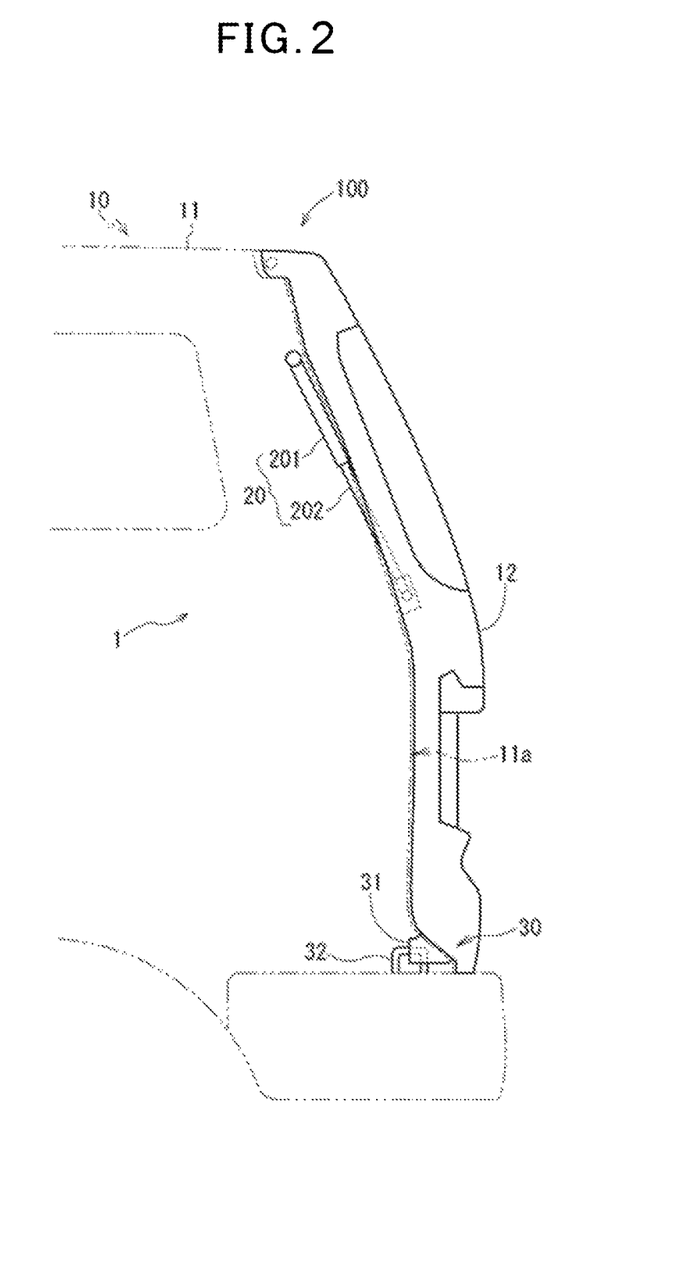
FIG. 2 shows a side view of a back door of the vehicle being in a closed posture.
Figure 3:
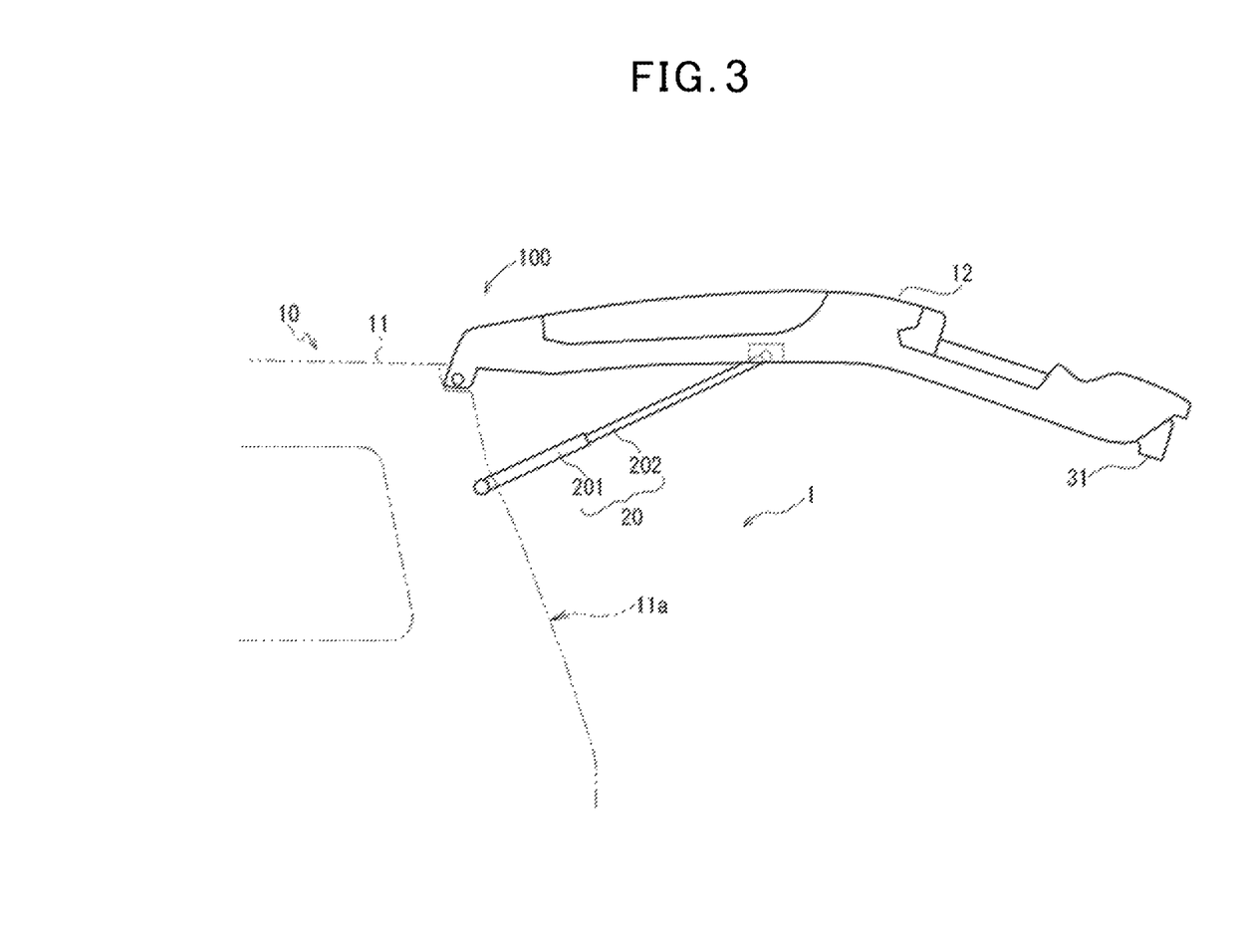
FIG. 3 shows a side view of the back door of the vehicle being in an opened posture.
Figure 4:
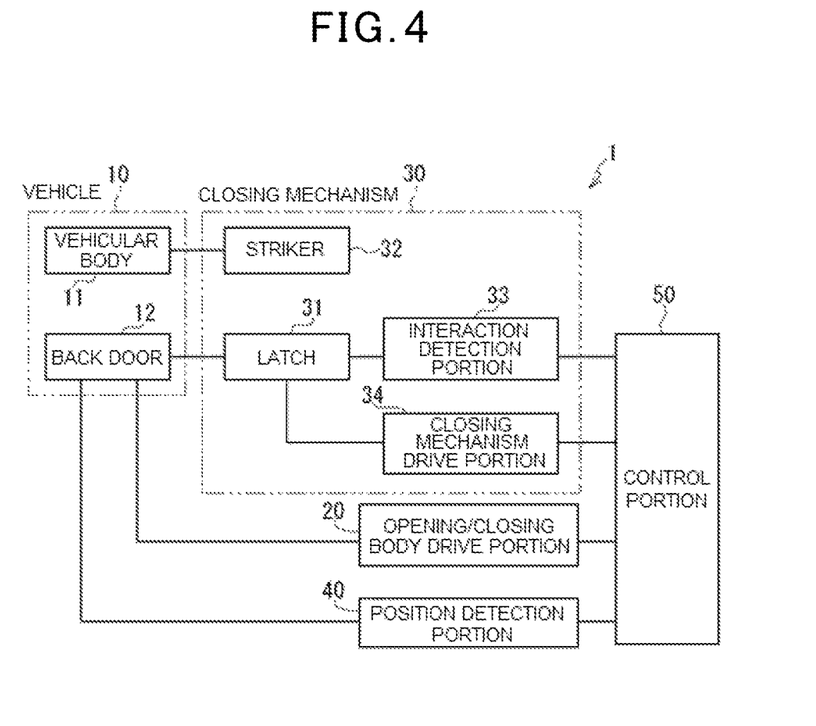
FIG. 4 shows a block diagram of the device for opening and closing the opening/closing body.
Figure 5A:
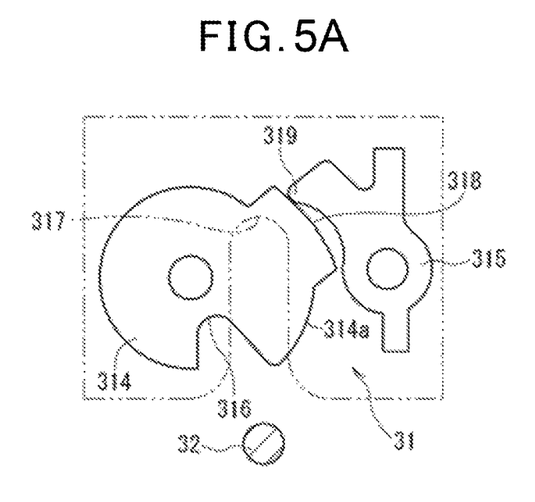
FIG. 5A shows an illustration in which a striker and a latch are separated.

As shown in FIG. 5A, a groove 317 that can receive the striker 32 thereinto is provided at the lower end of the back door 12. The closing mechanism 30 is configured such that the striker 32 goes into the groove 317 when the back door 12, which is the opening/closing body, moves in the closing direction to reach the closed position.

The latch 31 is arranged so as to move toward the groove 317 of the back door 12. The latch 31 has a cam member 314 rotatably supported by the back door 12 and a locking member 315 to hold the cam member 314 at a predetermined position in a rotating direction.

The cam member 314 is configured by a substantially disc-shaped member. The cam member 314 has a recess portion 316 into which the striker 32 is received at a part of the outer peripheral surface of the cam member 314.

Figure 5B:
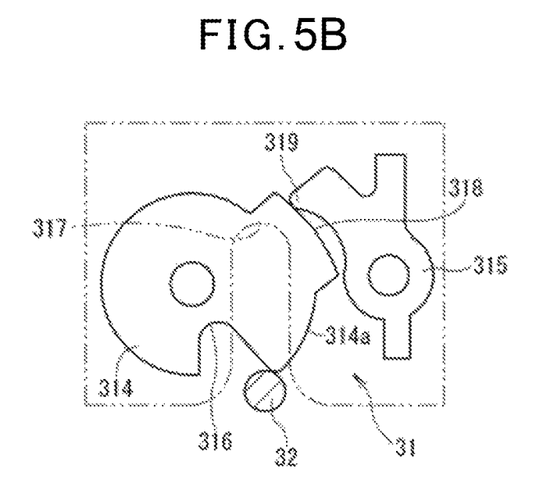
FIG. 5B shows an illustration in which the striker abutting a cam member of the latch.

When the striker 32 goes into the groove 317 in a case that the latch 31 is in the opened state, as shown in FIG. 5B, the striker 32 abuts the recess portion 316 of the cam member 314. When the striker 32 further goes into the groove 317 after the striker 32 abuts the recess portion 316, the cam member 314 is rotated by the striker 32 as shown in FIG. 6A.

Figure 6A:
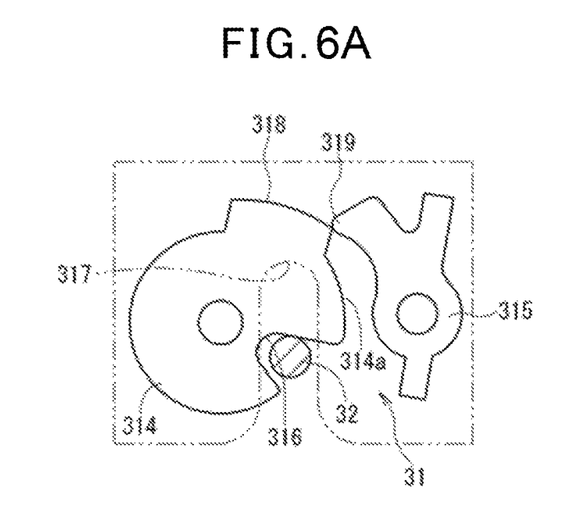
FIG. 6A shows an illustration in which the striker and the cam member of the latch are in the positional relationship such that the striker and the cam member can engage with each other.

In the state shown in FIG. 6A, the cam member 314 and the striker 32 are in a positional relationship being engageable with each other. In other words, in the state shown in FIG. 6A, the rotating position of the cam member 314 is a position in which the cam member 314 can engage with the striker 32. Moreover, in the state shown in FIG. 6A, the back door 12 is in a so-called half-closed state, not in the locked closed state.

When the cam member 314 is rotated to the engageable position, the cam member 314 is rotationally driven by the closing mechanism drive portion 34. In this case, the cam member 314 may have a cam switch transmitting an ON signal when the cam member 314 is rotated to the engageable position, and the closing mechanism drive portion 34 may be driven when the ON signal is input from the cam switch.

Figure 6B:
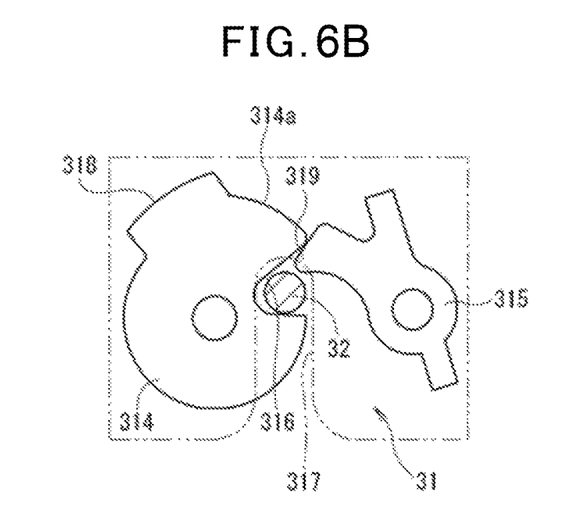
FIG. 6B shows an illustration in which the latch is shifting to be in the closed state and the striker reaches the locked position.

By rotationally driving the cam member 314 counterclockwise from the engageable position shown in FIG. 6A to shift the latch 31 to the closed state, the striker 32 is guided to the locking position. As shown in FIG. 6B, when shift of the latch 31 to the closed state is completed, the striker 32 reaches the locking position to bring the back door 12 to be in the completely closed state.

The cam member 314 has a cam surface 318 being arranged at a location being different from a location of the recess portion 316 at the outer peripheral surface of the cam member 314. The cam surface 318 projects outside in the radial direction with respect to other portions at the outer peripheral surface of the cam member 314. The cam member 314 has an outer peripheral surface 314a between the cam surface 318 and the recess portion 316 in the circumferential direction.

The locking member 315 has an abutment portion 319 abutting the outer peripheral surface of the cam member 314. The locking member 315 is biased in the direction in which the abutment portion 319 abuts the outer peripheral surface of the cam member 314.

The abutment portion 319 abuts the cam surface 318 from when the cam member 314 is in the posture shown in FIG. 5A and the latch 31 is in the opened state to when the cam member 314 is rotated by the striker 32 to reach the engageable position shown in FIG. 6A.

When the cam member 314 further rotates counterclockwise after reaching the engageable position, the abutment location of the abutment portion 319 with respect to the cam member 314 is shifted from the cam surface 318 to the outer peripheral surface 314a.

Thereafter, as shown in FIG. 6B, when the cam member 314 rotates counterclockwise until the striker 32 reaches the locking position, the abutment portion 319 of the locking member 315 gets into the recess portion 316 of the cam member 314. When the abutment portion 319 gets into the recess portion 316, the abutment portion 319 and the recess portion 316 engage with each other to cause rotating of the cam member 314 in the clockwise direction to be regulated.

In this way, the locked state of the striker 32 being guided to the locking position by the cam member 314 is maintained.

As described above, causing the latch 31 to be shifted to the closed state after the back door 12 moves to the closed position to reach the position at which the latch 31 can engage with the striker 32 when the latch 31 is in the open state makes it possible to guide the striker 32 to the locking position to bring the back door 12 to be in the completely closed state.

In the embodiment, the latch 31 is provided in the back door 12 and the striker 32 is provided in the vehicular body 11. However, the latch 31 may be provided in the vehicular body 11 and the striker 32 may be provided in the back door 12. In the invention, a publicly-known closing mechanism of a latch and a striker may be adopted as a matter of course.

The interaction detection portion 33 is to detect that the latch 31 and the striker 32 interacted. Here, "the latch 31 and the striker 32 interacting" means that one of (or both of) the latch 31 and the striker 32 acts against the other of the latch 31 and the striker 32 so that relativity between the latch 31 and the striker 32 arises. Interaction between the latch 31 and the striker 32 refers to abutting of the striker 32 to the latch 31, such as when the striker 32 and the latch 31 are brought to be in the engageable state, for example. Specifically, it refers to the state in which the striker 32 abutting the cam member 314 when the back door 12 moves in the closing direction to cause the cam member 314 to be rotated to the position at which the cam member 314 can engage with the striker 32, for example (the state shown in FIG. 6A). The interaction detection portion 33 may be configured as a limit switch to be turned on when the striker 32 is brought to be in the state such that it abuts the cam member 314 (the state shown in FIG. 6B).

The position detection portion 40 is to detect the position of the back door 12 being the opening/closing body.

The position detection portion 40, for example, has an encoder to detect the position of the back door 12, and is configured to detect the position of the back door 12 by counting output pulses from the encoder. In the invention, a publicly-known position detection mechanism may be used, as a matter of course, for the position detection portion.

The control portion 50 is configured by a microcomputer comprising a memory such as a ROM and a RAM, a CPU such as an ECU (Electronic Control Unit), and various interfaces. The control portion 50 controls driving of the opening/closing body 20 and the closing mechanism 30 by executing predetermined programs.

The opening/closing body drive portion 20, the interaction detection portion 33 of the closing mechanism 30, the closing mechanism drive portion 34 of the closing mechanism 30, and the position detection portion 40 are connected to the control portion 50.

Moreover, when the back door 12 is at the closed position, the control portion 50 is configured to reset position information showing the position of the back door 12 being detected by the position detection portion 40 to set the zero position.

Here, the state in which the back door 12 is at the closed position includes states ranging from a state in which the striker 32 starts to abut the recess portion 316 of the cam member 314 as shown in in FIG. 5B to a state in which the striker 32 reaches the locking position to cause the back door 12 to be completely closed as shown in FIG. 6B.

Figure 7:
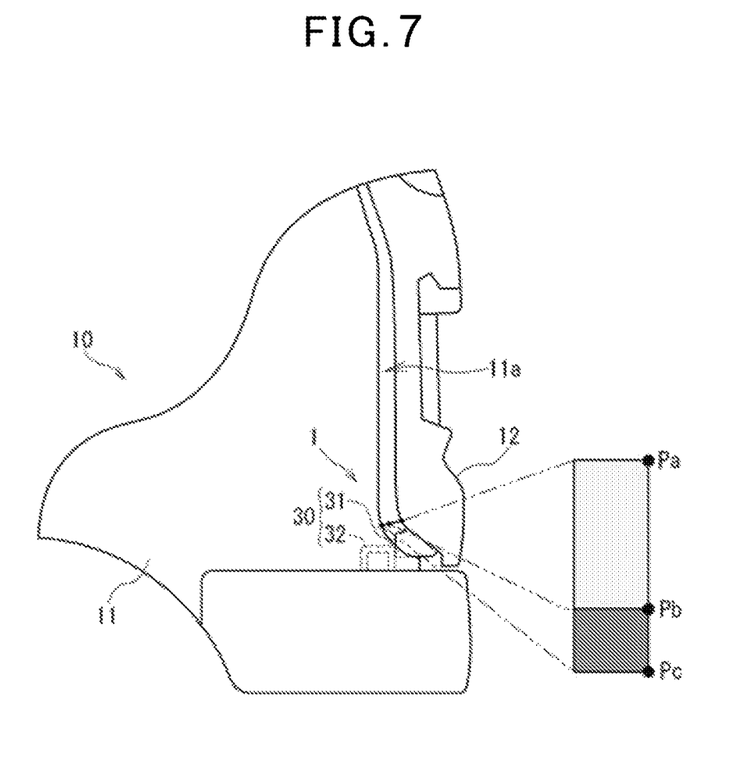
FIG. 7 shows an illustration of an abutment start position, an engagement position, and a closed position of the back door in a closed position.

In other words, as shown in FIG. 7, in accordance with the positions of the back door 12 being moved to the closed position, the state of the striker 32 and the latch 31 is brought to be in a plurality. These states include a state of being positioned at an abutment start position Pa at which the striker 32 starts to abut the latch 31 when the back door 12 moves in the closing direction (the state shown in FIG. 5B), a state of being positioned at an engagement position Pb at which the cam member 314 and the striker 32 have the positional relationship such that they can engage with each other (the state shown in FIG. 6A), and a state in which the striker 32 reaches the locking position to cause the striker 32 to be locked by the latch 31 (the state of being positioned at a closed position Pc at which the back door 12 is brought to be in the completely closed state, as shown in FIG. 6B). According to the invention, the engagement position Pb being brought to have the positional relationship such that the back door 12 is engageable and the closed position Pc at which at which it is brought to be in the completely closed state may be positions being the same for the back door 12.

In the embodiment, the control portion 50 shifts the latch 31 in the opened state to the closed state by the closing mechanism drive portion 34 when the back door 12 moves in the closing direction to the engagement position Pb and the interaction detection portion 33 detects that the latch 31 and the striker 32 interacted. Moreover, when the latch 31 is shifted to the closed state by the closing mechanism drive portion 34, the control portion 50 sets the movement position of the back door 12 detected by the position detection portion 40 to the zero position. While the control portion 50 sets the movement position of the back door 12 to the zero position when the back door 12 is in the closed state by the latch 31, the control portion 50 can also set the movement position to the zero position when the latch 31 starts to shift to the closed state.

Furthermore, when the back door 12 moves toward the closed position Pc from the engagement position Pb, the control portion 50 counts output pulses from the position detection portion 40 in the negative direction to calculate the movement position of the back door 12. On the contrary, when the back door 12 moves toward the abutment start position Pa from the engagement position Pb, the control portion 50 counts the output pulses from the position detection portion 40 in the positive direction to calculate the movement position of the back door 12.

In the vehicle 10, when the back door 12 is moved in the closing direction to lock the back door 12 in the closed state by the closing mechanism 30, the back door 12 may be pushed back by a weather strip being an elastic member provided at the peripheral edge of the opening of the vehicular body 11 and may be moved in the opening direction after the back door 12 once reaches the engagement position Pb. Moreover, when the vehicle 10 stops on an ascending slope, the back door 12 may be moved in the opening direction by gravity after the back door 12 once reaches the engagement position Pb.

In this way, when the back door 12 is moved in the opening direction after the back door 12 reaches the engagement position Pb to cause the interaction detection portion 33 to detect interaction between the latch 31 and the striker 32, the latch 31 may shift to the closed state from the opened state with the engagement state between the latch 31 and the striker 32 being released.

In this case, the movement position of the back door 12 is set to the zero position due to the shift of the latch 31 to the closed state although the back door 12 moves in the opening direction to cause the state in which the latch 31 and the striker 32 are disengaged with each other. In other words, the movement position of the back door 12 is set to the zero position when the back door 12 is at an inappropriate position.

Therefore, in a case that movement position information of the back door 12 is maintained as the zero position, not only at the time of shifting to the closed state, but also during the time of being in the closed state, for example, when the back door 12 being positioned in the opening direction with respect to the engagement position Pb moves in the opening direction by the opening/closing body drive portion 20, the back door 12 may be driven in the opening direction by the opening/closing body drive portion 20 even after the back door 12 is brought to be in the fully-opened state.

Moreover, as the latch 31 is being shifted to the closed state despite the back door 12 positions in the opening direction with respect to the engagement position Pb, the back door 12 cannot be locked at the closed position. Furthermore, even if the back door 12 is moved in the closing direction again, the latch 31 and the striker 32 cannot be engaged with each other.

However, in such a case, it is possible to determine that an erroneous zero position setting was carried out by an occurrence of a corresponding change in the position despite being locked after shifting to the closed state so that the latch 31 can be brought to be in the opened state in which the latch 31 can engage with the striker 32, and when the back door is again moved in the closing direction to lock the back door, the control portion 50 may carry out the zero position setting of the position information of the back door 12 in a case that the latch 31 shifts to the closed state. The above-mentioned zero position setting makes it possible to suppress an excessive opening/closing operation of the back door by zero position setting at an erroneous position of the back door 12. Moreover, the zero position setting at the erroneous position thereof occurring due to vehicle vibrations or integration errors with the back door 12 being in the closed state for a long time can also be prevented by the control portion 50 carrying out the zero position setting when the latch 31 shifts to the opened state.

[Closing Control]

The device for opening and closing opening/closing body 1 is configured to perform a closing control as follows by the control portion 50 when the back door 12 is moved in the closing direction to cause the closing mechanism 30 to lock the back door 12 in the closed state.

Figure 8:
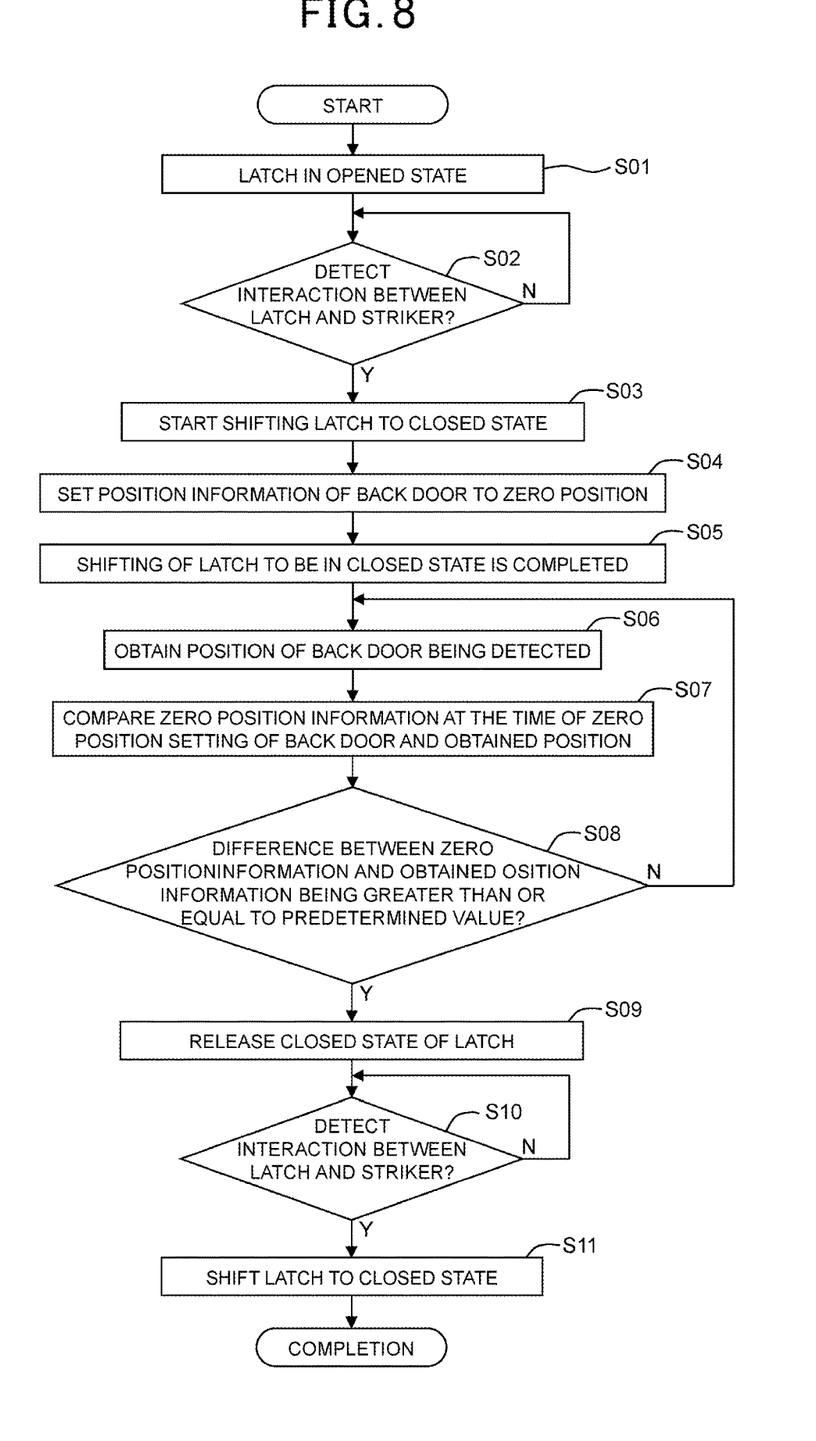
FIG. 8 shows a flow chart of a closing control by a control portion.

FIG. 8 shows a control flow chart of one example of control of the device for opening and closing opening/closing body 1. As shown in FIG. 8, in a case that the back door 12 being at the opened position is moved in the closing direction by the opening/closing body drive portion 20, for example, the latch 31 is in the opened state when the movement of the back door 12 is started (S01). When the back door 12 is moved in the closing direction to the closing position and reaches the engagement position Pb, interaction between the latch 31 and the striker 32 is detected by the interaction detection portion 33.

After movement of the back door 12 in the closing direction is started, the control portion 50 determines whether interaction between the latch 31 and the striker 32 is detected by the interaction detection portion 33 (S02).

In a case it is determined that the interaction between the latch 31 and the striker 32 is not detected by the interaction detection portion 33 in step S02, the control portion 50 performs step S02 again.

In a case it is determined that the interaction between the latch 31 and the striker 32 is detected by the interaction detection portion 33 in step S02, the control portion 50 drives the closing mechanism drive portion 34 to start shifting of the latch 31 positioned in the opened state to the closed state (S03). In other words, the control portion 50 causes the closing mechanism drive portion 34 to carry out closing driving to shift the latch 31 to the closed state when the control portion 50 obtains interaction information indicating that interaction between the latch 31 and the striker 32 occurred.

Moreover, when shifting of the latch 31 to the closed state is started, the control portion 50 resets position information, which is detected by the position detection portion 40 and shows the position of the back door 12 with respect to the opening of the vehicular body 11, and the control portion 50 sets it to the zero position (S04). In other words, the control portion 50 carries out zero position setting in which position information showing the position of the back door 12 is set to the zero position at the time or after shifting of the latch 31 to the closed state is started, or after the shifting of the latch 31 to the closed state is started. When the interaction information indicating that the interaction between the latch 31 and the striker 32 occurred is obtained, it may be determined that the opening/closing body moves to the closed position at which the opening of the vehicular body 11 is closed. When the interaction between the latch 31 and the striker 32 is detected by the interaction detection portion 33, the control portion 50 uses the detection of the interaction as second position information being different from first position information detected by the position detection portion 40 by driving of the opening/closing body, and determines that the opening/closing body is to move to the position at which the opening/closing body closes the opening. Then, the control portion 50 sets position information to the zero position.

After the position information of the back door 12 is set to the zero position by the control portion 50, shifting of the latch 31 to the closed state by the closing mechanism drive portion 34 is completed (S05).

After the shifting of the latch 31 to the closed state is completed, the control portion 50 obtains position information on the movement position of the back door 12 being detected in the position detection portion 40 (S06).

The control portion 50 compares the zero position information that is the position information of the back door 12 being set to the zero position in step S04 and the obtained position information that is the position information of the back door 12 being obtained in step S06 (S07).

As a result of comparing the zero position information and the obtained position information in step S07, the control portion 50 determines whether the difference being greater than or equal to a predetermined difference occurs between the value of the zero position information and the value of the obtained position (S08).

In this case, in a case that, for example, the striker 32 moves to the locking position by the latch 31 shifting to the closed state to cause the back door 12 to be in the completely closed state, the back door 12 moves toward the closed position Pc with respect to the engagement position Pb. Therefore, the obtained position information is brought to have a value in which output pulses from the position detection portion 40 are counted by the number of pulses corresponding to the distance between the engagement position Pb and the closed position Pc in the negative direction from the zero position.

Moreover, in a case that the back door 12 moves toward the abutment start position Pa with respect to the engagement position Pb, the obtained position information is brought to have a value in which the output pulses from the position detection portion 40 are counted in the positive direction from the zero position. The obtained position information is brought to have the value counted in the positive direction from the zero position in a state in which the latch 31 and the striker 32 are disengaged with each other by moving the back door 12 to the opening direction despite the latch 31 shifted to the closed state.

Therefore, in the embodiment, the control portion 50 is configured to determine that a difference being greater than or equal to a predetermined difference occurs between the value of the zero position information and the value of the obtained position information in a case that the value of the obtained position information is greater by at least a predetermined value in the positive direction with respect to the value of the zero position information in determination in step S08.

In a case that the control portion 50 determines that the difference being greater than or equal to the predetermined difference does not occur between the value of the zero position information and the value of the obtained position information in step S08, the process returns to step S06, and again obtains the position information on the movement position of the back door 12 being detected in the position detection portion 40.

When the value of the obtained position information is a value being on the negative side with respect to the value of the zero position information, or when the value of the obtained position information is a value being on the positive side with respect to the value of the zero position information and less than a predetermined value, the control portion 50 determines, in step S08, that the difference being greater than or equal to the predetermined difference does not occur between the value of the zero position information and the value of the obtained position information. The value of the obtained position information being the value on the negative side with respect to the value of the zero position information shows that the opening/closing body moved opposite direction to the opening direction.

In a case that the control portion 50 determines, in step S08, that the difference being greater than or equal to the predetermined difference occurs between the value of the zero position information and the value of the obtained position information, the control portion 50 drives the closing mechanism drive portion 34 to shift the latch 31 from the closed state to the opened state to cause the closed state of the latch 31 to be released (S09). This releasing of the closed state is not limited to immediately after the determining. For example, the releasing can be carried out after accepting a next operation by the user after determining an occurrence of the difference being greater than or equal to the predetermined difference, for example.

When the difference being greater than or equal to the predetermined difference occurs between the value of the zero position information and the value of the obtained position information, it can be determined as an abnormal state in which the latch 31 and the striker 32 are disengaged with each other despite the latch 31 shifted to the closed state, and the back door 12 is not in the completely closed state. Therefore, in the case the control portion 50 determines that the difference being greater than or equal to the predetermined difference occurs between the value of the zero position information and the value of the obtained position information, the control portion 50 shifts the latch 31 from the closed state to the opened state so that the latch 31 and the striker 32 can engage with each other. The predetermined difference between the value of the zero position information and the value of the obtained position information may be set to a value exceeding the difference in the range in which movement of the striker 32 can be prevented by the latch 31.

In this way, when the back door 12 being positioned on the abutment start position Pa side with respect to the engagement position Pb moves to the closing side again, the latch 31 and the striker 32 can be engaged with each other.

Then, when the back door 12 moves in the closing direction again and back door 12 moves to the engagement position Pb being a proper position, interaction between the latch 31 and the striker 32 may be detected by the interaction detection portion 33 of the closing mechanism 30, the latch 31 may be shifted to the closed state to lock the back door 12, and the zero position setting of the position information of the back door 12 may be carried out.

In other words, even though the zero position setting of the back door 12 is once carried out at an inappropriate position, when the back door 12 is locked by the closing mechanism 30, it is possible to carry out the zero position setting again by the control portion 50.

Moreover, in a case that the control portion 50 determines that the difference being greater than or equal to the predetermined difference occurs between the value of the zero position information and the value of the obtained position information, the control portion 50 may determine that the locked state of the back door 12 is abnormal and the control portion 50 controls the opening/closing body drive portion 20 such that driving is not started when the opening/closing body drive portion 20 receives an instruction for driving. In this way, even when the back door 12 being positioned to the abutment start position Pa side with respect to the engagement position Pb is driven in the opening direction by the opening/closing body drive portion 20, it can be suppressed that a mechanical burden is applied to the back door 12 by further driving the back door 12 in the opening direction after the back door 12 is positioned at the fully-opened state.

Moreover, in a case that the control portion 50 determines that the difference being greater than or equal to the predetermined difference occurs between the value of the zero position information and the value of the obtained position information, the control portion 50 may announce an alarm that the abnormality state occurs by announcing means provided in the vehicular body 11 or the back door 12.

In this way, announcing that the abnormality state occurs makes it possible to suppress the user carrying out an instruction that the opening/closing body drive portion 20 drives the back door 12 in the opening direction to the control portion 50 with the back door 12 being positioned to the abutment start position Pa side with respect to the engagement position Pb. In this way, it can be suppressed that a mechanical burden is applied to the back door 12 by driving the back door 12 in the opening direction by the opening/closing body drive portion 20 after the back door 12 is positioned at the fully-opened state.

Moreover, when the user manually shifts the latch 31 from the opened state to the closed state with the back door 12 being positioned to the opening side with respect to the abutment start position Pa, for example, the position information of the back door 12 is set to the zero position at the movement position when the latch 31 is shifted to the closed state. The position of the back door 12 being set to this zero position is being positioned to the opening side with respect to the engagement position Pb at which the control portion 50 carries out the zero position setting. Therefore, when the back door 12 is driven in the opening direction by the opening/closing body drive portion 20 from the position at which the user shifts the latch 31 to the closed state, a mechanical burden could be applied to the back door 12 by driving the back door 12 in the opening direction even after the back door 12 is positioned at the fully-opened state.

However, in the device for opening and closing opening/closing body 1 of the embodiment, the control portion 50 can determine that, after the position information of the back door 12 is set to the zero position, the back door 12 moved in the opening direction by a value being greater than or equal to the predetermined value, or, in other words, that the difference being greater than or equal to the predetermined difference occurred between the value of the zero position information being the position information on the movement position of the back door 12 and the value of the obtained position information.

Therefore, in a case that the control portion 50 determines that the difference being greater than or equal to the predetermined difference occurred between the value of the zero position information and the value of the obtained position information occurred, the control portion 50 may be configured to not start driving by the opening/closing body drive portion 20 even though an instruction to start driving by the opening/closing body 20 is made to the control portion 50 thereafter.

Moreover, the device for opening and closing opening/closing body 1 has the opening/closing body drive portion 20, and the opening/closing body drive portion 20 can drive the back door 12 to move it in the closing direction. In this way, the back door 12 can be moved in the closing direction at an appropriate speed by the opening/closing body drive portion 20, making it possible to smoothly carry out an operation to shift the latch 31 to the closed state when the interaction between the latch 31 and the striker 32 is detected by the interaction detection portion 33.

The control portion 50 determines whether the interaction between the latch 31 and the striker 32 is detected by the interaction detection portion 33 (S10) after shifting the latch 31 to the opened state in step S09.

In a case that the control portion 50 determines, in step S10, that the interaction between the latch 31 and the striker 32 is not detected by the interaction detection portion 33, the control portion 50 performs step S10 again.

In a case that the control portion 50 determines, in step S10, that the interaction between the latch 31 and the striker 32 is detected by the interaction detection portion 33, the control portion 50 drives the closing mechanism drive portion 34 to start shifting of the latch 31 in the opened state to the closed state (S11). In other words, in a case that the interaction information that the interaction between the latch 31 and the striker 32 occurred is obtained after shifting the latch 31 to the opened state in step S09, the control portion 50 causes the closing mechanism drive portion 34 to carry out closing driving to shift the latch 31 to the closed state.

In this way, even in a case that the back door 12 is moved in the opening direction from the engagement position Pb once, the back door 12 can be brought to be in the completely closed state by shifting the latch 31 to the closed state again when the interaction between the latch 31 and the striker 32 is detected thereafter.

When shifting of the latch 31 to the close state is started in step S11, the control portion 50 may perform step S04 again so that the position information indicating the movement position of the back door 12 being detected in the position detection portion 40 may also be reset to set it to the zero position.

In this way, setting the position information of the back door 12 to the zero position again makes it possible to improve the accuracy of the zero information of the back door 12.

In the embodiment, the position information of the back door 12 is configured to be set to the zero position when the back door 12 reaches the engagement position Pb to start shifting of the latch 31 to the closed state. However, it may also be configured to be set to the zero position when the latch 31 shifts to the completely closed state to cause the back door 12 to reach the closed position Pc from the engagement portion Pb. Moreover, the position information of the back door 12 may be set to the zero position in the process in which the back door 12 reaches the closed position Pc from the engagement position P.

In other words, while the zero position setting in which the position information of the back door 12 is set to the zero position is carried out when the latch 31 shifts to the closed state in the device for opening and closing opening/closing body 1, the above-mentioned "when the latch 31 shifts to the closed state" includes the time when the latch 31 starts to shift to the closed state, the time when shifting of the latch 31 to the closed state is completed, and the time between the time of starting of shifting and the time of completing of shifting of the latch 31 to the closed state. Therefore, when the position information of the back door 12 is set to the zero position means that the shifting of the latch 31 to the closed state is used as one criterion, not time.

Moreover, while the device for opening and closing opening/closing body 1 comprising the opening/closing body drive portion 20 to carry out driving to open/close the back door 12 has been described in the embodiment, the closing control of the control portion 50 may be applied even in the configuration in which the device for opening and closing opening/closing body 1 does not comprise the opening/closing body drive portion 20, but the user himself/herself carries out opening/closing of the back door 12 of the vehicle 10.

In other words, when the back door 12 is moved in the closing direction by the user and locked in the closed state by the closing mechanism 30, a closing control by the control portion 50 may be performed.

In the embodiment, the zero position setting in which the position information of the back door 12 is set to the zero position is carried out when the latch 31 shifts to the closed state. However, the control portion 50 may carry out the zero position setting when the latch 31 shifts to the open state. In other words, the control portion 50 may carry out the zero position setting in which the position information of the back door 12 is set to the zero position when the control portion 50 drives the closing mechanism drive portion 34 in order to release the state in which the latch 31 is in the closed state and the back door 12 cannot be closed.

The control portion 50 may carry out the above-described zero position setting when shifting the latch 31 of the closing mechanism 31 to the closed state or to the opened state. Therefore, a continuous zero position setting which is occurred by carrying out the zero position setting when the latch 31 is positioned in the closed state as in the conventional device for opening and closing opening/closing body can be avoided. The control portion 50 may carry out the above-described zero position setting in only either one of or both of when the latch 31 shifts to the closed state and when the latch 31 shifts to the opened state.

Moreover, while the device for opening and closing opening/closing body 1 is configured to be a device to control the opening/closing operation of the back door 12 in the vehicle 10 in the embodiment, it can also be configured to be a device to control the opening/closing operation of a different door such as a slide door to open/close the lateral surface of the vehicle 10.

In this way, by setting an opening/closing body in which the opening/closing operation thereof is controlled by the device for opening and closing opening/closing body 1 to be a door of the vehicle 10, such as the back door 12 and the slide door, makes it possible to carry out the zero position setting again by the control portion 50 using the closing mechanism 30, even though the zero position setting is carried out once with the position of the door being at an inappropriate position when the door is closed. Moreover, a problem arising with the opening operation of the door when the door once closed is moved in the opening direction can be suppressed.

As an opening/closing body to control the opening/closing operation by the device for opening and closing opening/closing body 1, a trunk lid, a bonnet, a sunroof, or a window glass being provided in the door, besides a door of the vehicle 10, can be applied.

DESCRIPTION OF REFERENCE NUMERALS

1 DEVICE FOR OPENING AND CLOSING OPENING/CLOSING BODY
10 VEHICLE
100 OPENING MEMBER
11 VEHICULAR BODY
11*a* OPENING
12 BACK DOOR (OPENING/CLOSING BODY)
20 OPENING/CLOSING BODY DRIVE PORTION
201 TUBULAR BODY
202 SLIDING TUBULAR PORTION
21 DRIVE MOTOR
22 CLUTCH
23 ARM
24 ROD
30 CLOSING MECHANISM
31 LATCH
32 STRIKER
33 INTERACTION DETECTION PORTION
34 CLOSING MECHANISM DRIVE PORTION
40 POSITION DETECTION PORTION
50 CONTROL PORTION
60 GAS DAMPER
61 TUBE
62 ROD
314 CAM MEMBER
314*a* OUTER PERIPHERAL SURFACE
315 LOCKING MEMBER
316 RECESS PORTION
317 GROOVE
318 CAM SURFACE
319 ABUTMENT PORTION
Pa ABUTMENT START POSITION
Pb ENGAGEMENT POSITION
Pc CLOSED POSITION

The invention claimed is:

1. A device for opening and closing an opening/closing body comprising:
an opening/closing body to open and close with respect to an opening of a base body; a closing mechanism to lock the opening/closing body in a closed state; a control portion to control driving of the closing mechanism; and a position detection portion to detect the position of the opening/closing body, wherein
the closing mechanism includes an engaging portion being provided in either one of the base body and the opening/closing body; an engaged portion being provided in either one of the base body and the opening/closing body; a closing mechanism drive portion to shift the engaging portion between an opened state and a closed state; and an interaction detection portion to detect that the engaging portion and the engaged portion interacted;
the opened state of the engaging portion is a state in which the engaged portion is movable to a position in which the engaged portion can engage with the engaging portion;
the closed state of the engaging portion is a state in which the engaged portion is locked by the engaging portion; and
the control portion carries out zero position setting to set position information to the zero position, the position information showing the position of the opening/closing body, when the engaging portion of the closing mechanism shifts to the closed state,
obtains position information on a movement position of the opening/closing body being detected in the position detection portion after shifting of the engaging portion to the closed state,
compares zero position information that is position information of the opening/closing body being set to the zero position in the zero position setting with obtained position information that is position information on obtained movement position of the opening/closing body, wherein the zero position setting is carried out when the opening/closing body moves in a closing direction and an interaction between the engaging portion and the engaged portion is detected by the interaction detection portion, the interaction indicating that the engaging portion and the engaged portion abut so as to be brought to be in an engageable state, and determines an abnormal state in which the opening/closing body is not in a completely closed state in a case that a difference being greater than or equal to a predetermined difference occurs between a value of the zero position information and a value of the obtained position information and in a case that the engaging portion is in the closed state, wherein the difference being greater than or equal to the predetermined difference indicates that the opening/closing body is positioned at a side in an opening direction of the opening/closing body with respect to the position in which the engaged portion can engage with the engaging portion.

2. The device for opening and closing an opening/closing body according to claim 1, further comprising an opening/closing body drive portion to shift the opening/closing body to an opened state or to a closed state.

3. The device for opening and closing an opening/closing body according to claim 1, wherein the opening/closing body is a door of a vehicle.

4. A device for opening and closing an opening/closing body comprising:

an opening/closing body to open and close with respect to an opening of a base body; a closing mechanism to lock the opening/closing body in a closed state; a control portion to control driving of the closing mechanism; and a position detection portion to detect the position of the opening/closing body, wherein the closing mechanism includes an engaging portion being provided in either one of the base body and the opening/closing body; an engaged portion being provided in either one of the base body and the opening/closing body; a closing mechanism drive portion to shift the engaging portion between an opened state and a closed state; and an interaction detection portion to detect that the engaging portion and the engaged portion interacted;

the opened state of the engaging portion is a state in which the engaged portion is movable to a position in which the engaged portion can engage with the engaging portion;

the closed state of the engaging portion is a state in which the engaged portion is locked by the engaging portion; and the control portion carries out zero position setting to set position information to the zero position, the position information showing the position of the opening/closing body, when the engaging portion of the closing mechanism shifts to the closed state, obtains position information on a movement position of the opening/closing body being detected in the position detection portion after shifting of the engaging portion to the closed state, and compares zero position information that is position information of the opening/closing body being set to the zero position in the zero position setting with obtained position information that is position information on obtained movement position of the opening/closing body, wherein the zero position setting is carried out when the opening/closing body moves in a closing direction and an interaction between the engaging portion and the engaged portion is detected by the interaction detection portion, the interaction indicating that the engaging portion and the engaged portion abut so as to be brought to be in an engageable state, and determines an abnormal state in which the opening/closing body is not in a completely closed state and drives the closing mechanism drive portion to cause the closed state of the engaging portion to be released in a case that a difference being greater than or equal to a predetermined difference occurs between a value of the zero position information and a value of the obtained position information and the engaging portion is in the closed state, wherein the difference being greater than or equal to the predetermined difference indicates that the opening/closing body is positioned at a side in an opening direction of the opening/closing body with respect to the position in which the engaged portion can engage with the engaging portion.

5. The device for opening and closing the opening/closing body according to claim 4, further comprising an opening/closing body drive portion to shift the opening/closing body to an opened state or to a closed state.

6. The device for opening and closing the opening/closing body according to claim 4, wherein the opening/closing body is a door of a vehicle.

* * * * *